United States Patent
Yeung et al.

(10) Patent No.: US 7,671,694 B2
(45) Date of Patent: Mar. 2, 2010

(54) PROGRAMMABLE PASSIVE EQUALIZER

(75) Inventors: Evelina F Yeung, San Jose, CA (US);
Sanjay Dabral, Palo Alto, CA (US);
Pascal Meier, Sunnyvale, CA (US);
Santanu Chaudhuri, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/156,532

(22) Filed: Jun. 2, 2008

(65) Prior Publication Data

US 2008/0238588 A1    Oct. 2, 2008

Related U.S. Application Data (63) Continuation of application No. 11/198,111, filed on Aug. 5, 2005, now Pat. No. 7,394,331.

(51) Int. Cl.
*H04B 3/04* (2006.01)

(52) U.S. Cl. ........................ 333/28 R; 333/18

(58) Field of Classification Search ............... 333/28 R, 333/18
See application file for complete search history.

(56) References Cited

U.S. PATENT DOCUMENTS

| | | | |
|---|---|---|---|
| 1,511,013 | A | 10/1924 | Affel |
| 1,603,305 | A | 7/1926 | Zobel |
| 1,686,792 | A | 6/1928 | Black |
| 1,743,132 | A | 9/1930 | Green |
| 2,054,657 | A | 1/1936 | Myer |
| 2,096,027 | A | 10/1937 | Bode |
| 2,242,878 | A | 1/1941 | Bode |
| 2,719,270 | A | 9/1955 | Ketchledge |
| 4,132,958 | A | 1/1979 | Addis et al. |
| 4,135,057 | A * | 1/1979 | Bayless et al. .............. 375/280 |
| 4,146,844 | A | 3/1979 | Quinn |
| 6,757,327 | B1 | 6/2004 | Fiedler |
| 2007/0030092 | A1 | 2/2007 | Yeung et al. |

OTHER PUBLICATIONS

"Designing a Simple, Small, Wide-band and Low-Power Equalizer for FR4 Copper Links", *Maxim Integrated Products, Technical Article*: HFTA-06.0, (Jan. 28, 2003).

* cited by examiner

*Primary Examiner*—Stephen E Jones
(74) *Attorney, Agent, or Firm*—Lee & Hayes, PLLC (57) ABSTRACT

Embodiments of a programmable passive equalizer are described herein.

8 Claims, 6 Drawing Sheets

PROGRAMMABLE PASSIVE EQUALIZER

RELATED APPLICATIONS

This application is a continuation of and claims priority to U.S. patent application Ser. No. 11/198,111, filed on Aug. 5, 2005, now U.S. Pat. No. 7,394,331, the disclosure of which is incorporated by reference herein.

BACKGROUND

An electrical channel may be made up of a variety of components which may have an effect on an electrical signal communicated through the channel. Additionally, the channel (and more particularly the components of the channel) may affect portions of the signal differently. For example, the channel may have different effects on signals of different frequencies. Signals of different frequencies, for instance, may experience difference attenuations and phase shifts. Thus, the shape of the waveform of the signal may be distorted after being transmitted through the channel.

BRIEF DESCRIPTION OF THE DRAWINGS

The same reference numbers are utilized in instances in the discussion to reference like structures and components.

DETAILED DESCRIPTION

Equalization may be utilized to compensate for effects of a channel on an electrical signal (hereinafter "signal"), such as to compensate for effects caused by packaging, connectors, and so on. Additionally, transmission of the signal may affect signals of different frequencies differently. For instance, a signal component at relatively lower frequencies may experience less loss in power than a signal component at relatively lower frequencies. Thus, the shape of the waveform of the signal may be distorted after being transmitted through the channel and this may affect suitability of the signal for its desired purpose.

A passive equalizer is described which may be utilized to compensate for the effect of the channel on the signal. For example, the passive equalizer may be configured to reduce and or remove the differing effects of the channel on different frequencies of the signal and thereby preserve the integrity of the signal. In the following discussion an exemplary environment is described which is operable to employ a passive equalizer, along with a variety of exemplary passive equalizers which may be utilized in the environment. Exemplary procedures are then described which may be employed in the exemplary environment, as well as in other environments.

Exemplary Environment

Figure 1:
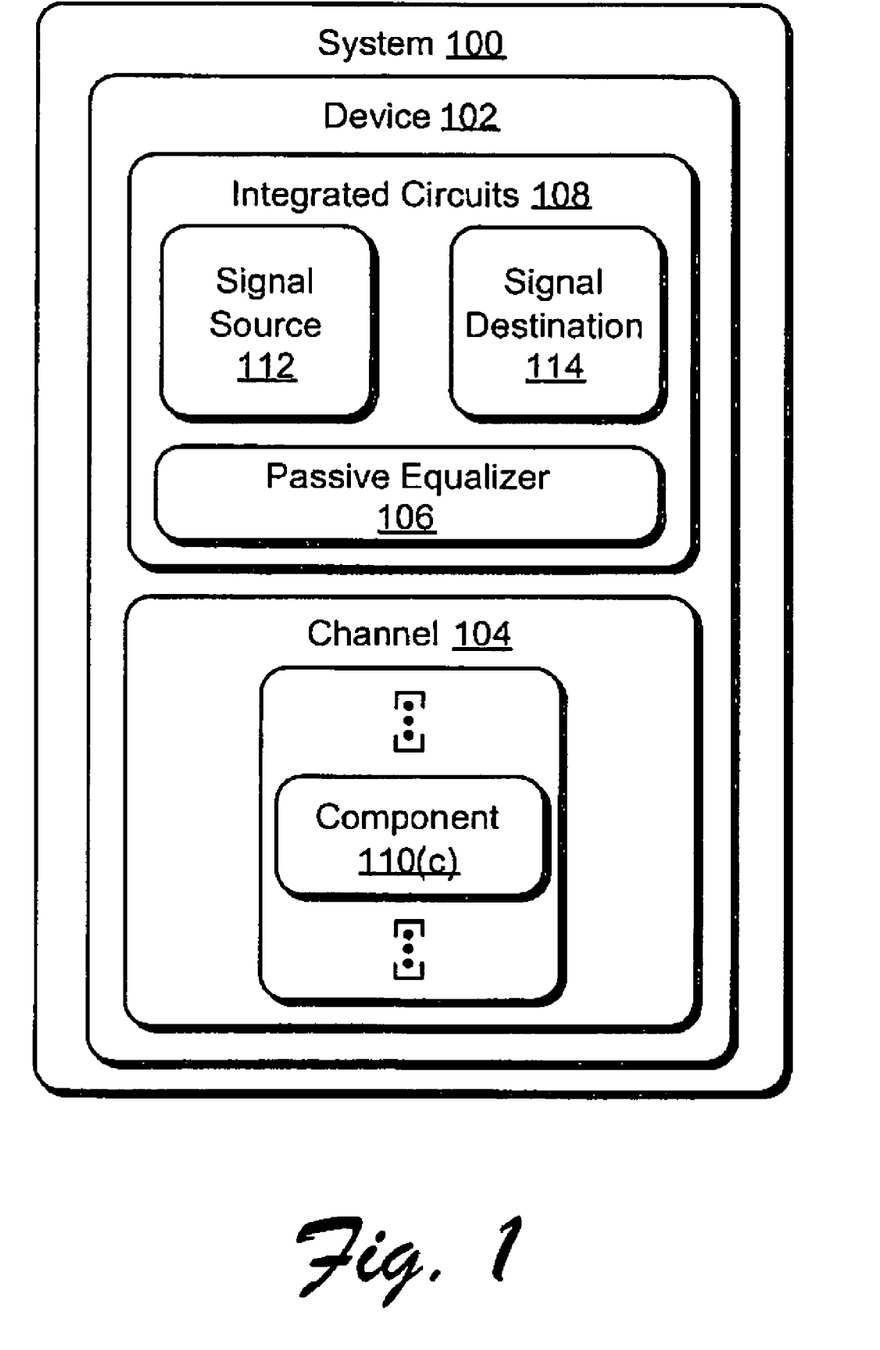
FIG. 1 is an illustration in an exemplary implementation showing a system in which a device includes an integrated circuit that employs a passive equalizer.

FIG. 1 shows a system 100 in an exemplary implementation in which a device 102 includes integrated circuits 108 that employ a passive equalizer 106. The device 102 may be configured in a variety of ways. For example, the device 102 may be configured as a computer (e.g., a desktop personal computer, laptop computer, game console, personal digital assistant, and so on), an information appliance, a communication device, a peripheral device, and so forth.

The device 102 includes a plurality of integrated circuits 108 which are communicatively coupled via the channel 104. The channel 104 is illustrated as having a plurality of components 110(c), where "c" can be any integer from one to "C". The channel 104 is configured to receive an input signal from a signal source 112 and providing an output signal to a signal destination 114. The signal source 112 and the signal destination may be representative of a variety of signal sources and destinations, and are not limited to a "final" destination for the signal. For example, the signal destination 114 may be configured as another stage for further processing of the signal communicated via the channel 104.

The plurality of components 110(c) may be configured in a variety of ways, such as a connecting component (e.g., printed circuit board traces, connectors, package traces, vias, and so on), an "operational" components (e.g., amplifiers, capacitors, resistors), and so forth. For example, the channel 104 may implement a high-speed (e.g., Gigabi t) input/output channel to provide multiprocessor interconnections (e.g., peripheral-component-interconnect express (i.e., PCI-express)), data communications (e.g., backplane serializer/deserializer, Ten-Gigabit-per-second Ethernet Attachment Unit Interface (XAUI)), network switches, memory interfaces (e.g., Fully-Buffered Dual Inline Memory Module (FBD)), consumer products with extensive multimedia applications, and so on. Thus, the channel 104 may be configured in a variety of ways to provide a wide variety of functionality, such as an input/output channel, further discussion of which may be found in relation to FIGS. 2-4.

The channel 104, and more particularly components 110(c) of the channel 104, may cause signal loss when transmitting the signal through the components 110(c), such as due to configuration of the components themselves (e.g., native functionality of the components), packaging of the components (e.g., process errors in the components), and so on. This loss may be different, however, depending on characteristics of the signal being transmitted because of the components 110(c) and packaging of the components 110(c). For example, the channel 104 may attenuate a signal by increasingly greater amounts at relatively increasingly higher frequencies, i.e., the amount of attenuation increases as the frequency of the signal increases. To compensate for this attenuation, the passive equalizer 106 may be configured such that differences are minimized to preserve the original waveform of the signal being transmitted. Therefore, equalization performed by the passive equalizer 106 may compensate for frequent-dependent differences in channel loss. For instance, the equalization performed by the passive equalizer 106 may "normalize" the loss caused to the signal by the channel 106 such that this loss is not substantially different at different frequencies.

The passive equalizer 106 may be configured in a variety of ways to provide equalization of a signal communicated via the channel 104. For example, the passive equalizer 106 may be configured as a simple, programmable "on-chip" continuous-time equalizer which uses passive components to provide accurate peaking gain and peaking frequency given manufacturing process variations at a given signaling frequency, further discussion of which may be found in relation to FIG. 7. In one or more implementations, the passive equalizer 106 may also be "tuned" to peak at variable frequencies in respect to frequency changes of the signal being transmitted across the channel, further discussion of which may be found in relation to FIG. 8. The passive equalizer 106 may also be configured to provide the function of an on-chip termination network of the integrated circuit 108 to improve termination of high-frequency signals, which is illustrated in FIG. 1 through inclusion of the passive equalizer 106 within a termination network.

Reference will now be made generally to FIGS. 2-5. The passive equalizer 106 of FIG. 1 may be utilized in a variety of channels 104 (e.g., clock channel, data channel, and so on) to compensate for signal attenuation caused by components of the channel. For example, the passive equalizer 106 may be included in a channel to increase accuracy in a source-synchronous parallel input/output (I/O) interface.

Figure 2:
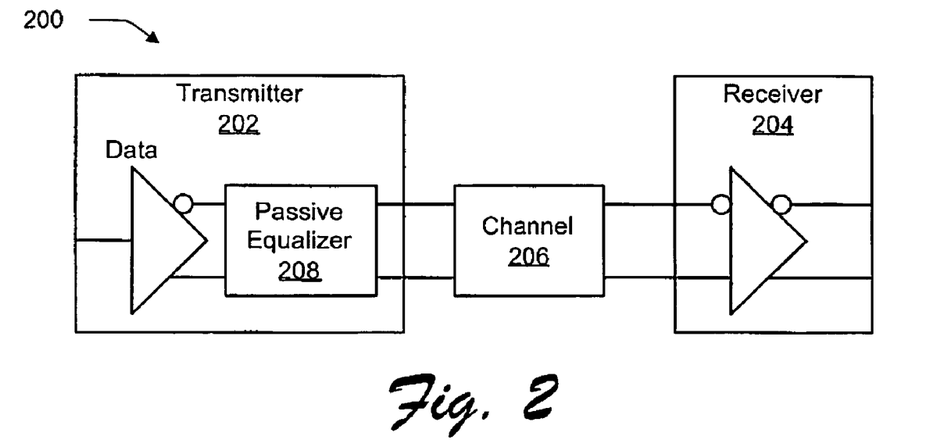
FIG. 2 is an illustration of a transmission system in an exemplary implementation which includes a transmitter, channel, and a receiver. The transmitter includes a passive equalizer at the transmitter front-end.

Passive equalizers may be placed in a variety of locations within a channel. For example, FIG. 2 is an illustration of a system 200 in an exemplary implementation which includes a transmitter 202 and a transmitter front end 204 communicatively coupled via a channel 206. The transmitter 202 in this instance is illustrated as including a passive equalizer 208.

Figure 3:
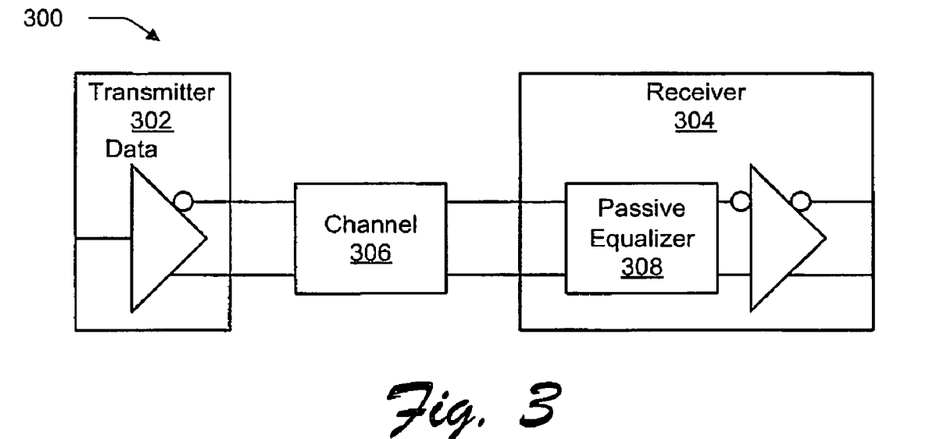
FIG. 3 is an illustration of a transmission system in an exemplary implementation which includes a transmitter, channel, and a receiver. The receiver includes a passive equalizer at the receiver's front-end.

In another example, FIG. 3 illustrates a system 300 in an exemplary implementation in which a transmitter 302 is communicatively coupled to a receiver front end 304 via a channel 306. In this example, the passive equalizer 308 is included in the receiver 304 front end.

Figure 4:
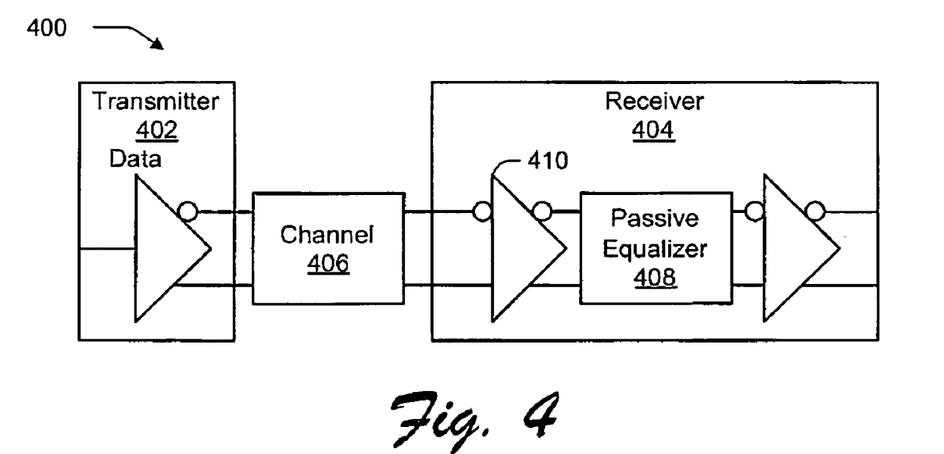
FIG. 4 is an illustration of a transmission system in an exemplary implementation which includes a transmitter, channel, and a receiver. The receiver includes a passive equalizer after buffering at the receiver front-end.

In a further example, FIG. 4 illustrates a system 400 in an exemplary implementation in which a transmitter 402 is again communicatively coupled to a receiver 404 via a channel 406. In this example, however, the passive equalizer 408 is included in the receiver 404 after a buffer 410.

Thus, as shown in FIGS. 2-4, on-chip passive equalizers may be placed in a variety of different locations the signal path. The placement of the passive equalizer 106 may be utilized to provide differing functionality. For example, by placing the passive equalizer at a front-end (e.g., whether the front end is a transmitter or receiver), the passive equalizer may also function as termination of the channel, thereby eliminating the need for an explicit termination device in a data channel. Use of the passive equalizer as the termination network may also improve the accuracy of termination at high frequencies. Low-pass filtering of the pad capacitance $C_{pad}$, for instance, may reduce the frequency range of effective termination of the termination network. Placing a passive equalizer at the front-end introduce one or more zeros in the frequency response that cancels the effect of the pole introduced by the pad capacitance, and hence extends the frequency range of effective termination. In this way, the passive equalizer improves the termination at high frequencies.

The presence of the pad capacitance may also hence reduce the values of inductor and capacitor components required for peaking. Further discussion of which may be found in relation to FIGS. 5-7.

In an embodiment, however, a front-end passive equalizer may be configured to sustain a high current, including the signaling current (often above 10 mA) as well as electrostatic discharge (ESD) events. To comply with current density rules for metals, the inductor metal layer may therefore be configured to be wider than otherwise required, which may lead to an increased inductor area (further discussion of which may be found in relation to FIG. 5) and hence larger equalizer area of the passive equalizer 106. Additionally, ESD requirements for placing a capacitor at the front-end may also be quite complex.

Therefore, the passive equalizer may be placed after buffering (e.g., buffer 410) at the receiver 404 as shown in FIG. 4. Even though the values of the inductor and capacitor needed for peaking at certain frequency increase due to the absence of $C_{pad}$, the component physical sizes may be potentially smaller, especially at higher frequencies, because the currents that are carried by the components are significantly lower. This design is also flexible in that the effective impedance is not restricted to match characteristic impedance of the transmission line as is the case of a front-end passive equalizer, and there are no complex ESD rules to follow.

Figure 5:
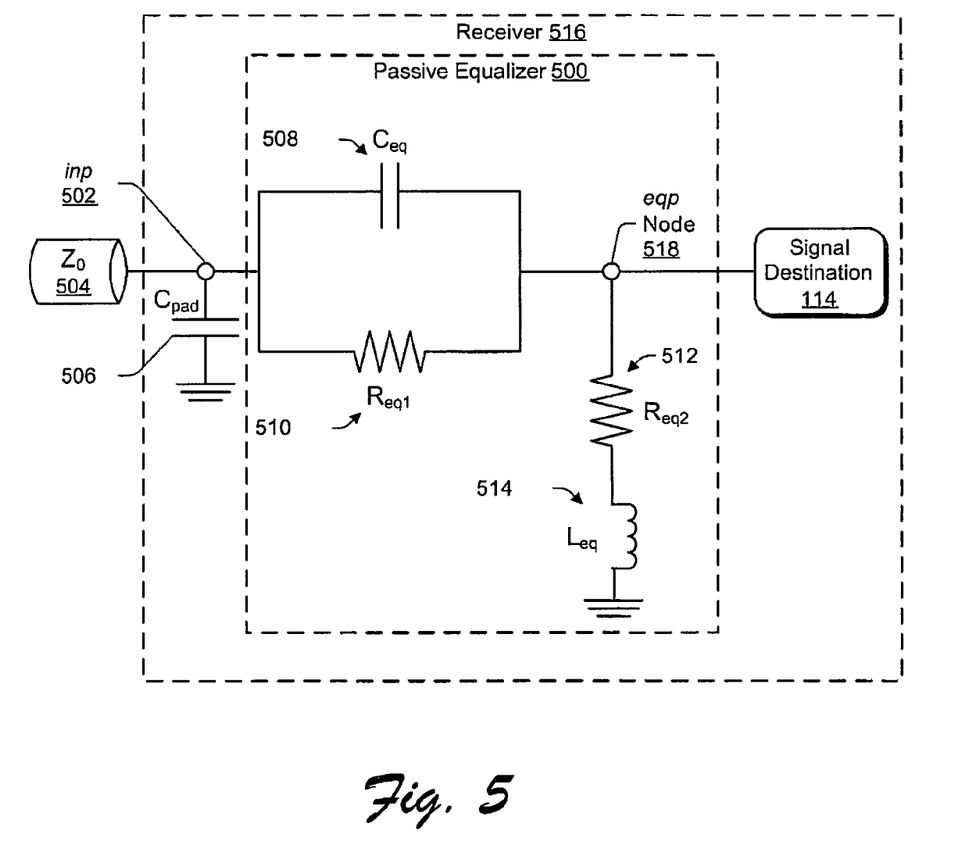
FIG. 5 is an illustration in an exemplary implementation showing a passive equalizer employed in a single-ended line in greater detail.
Figure 6:
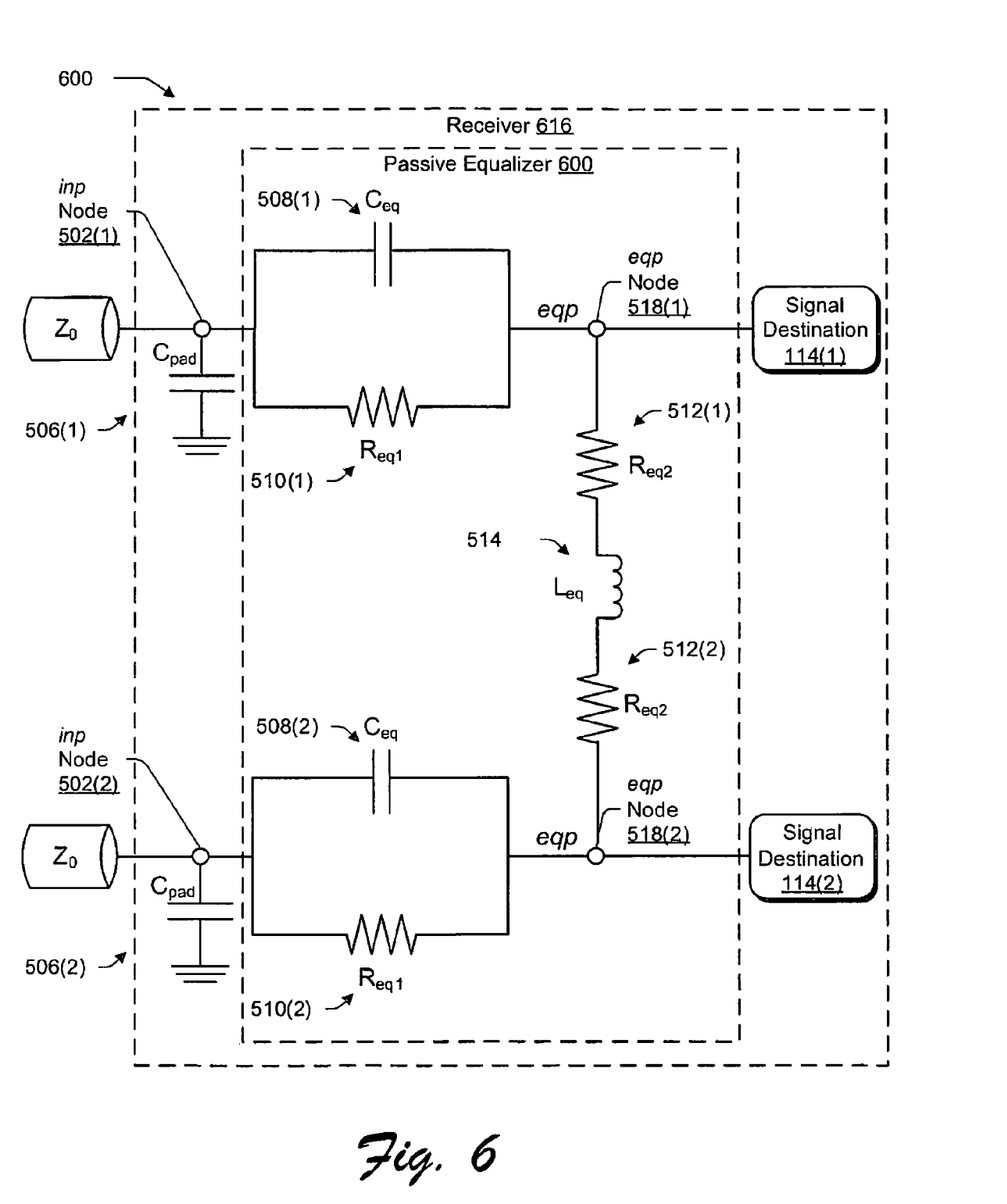
FIG. 6 is an illustration in an exemplary implementation showing a passive equalizer employed in differential lines in greater detail.
Figure 7:
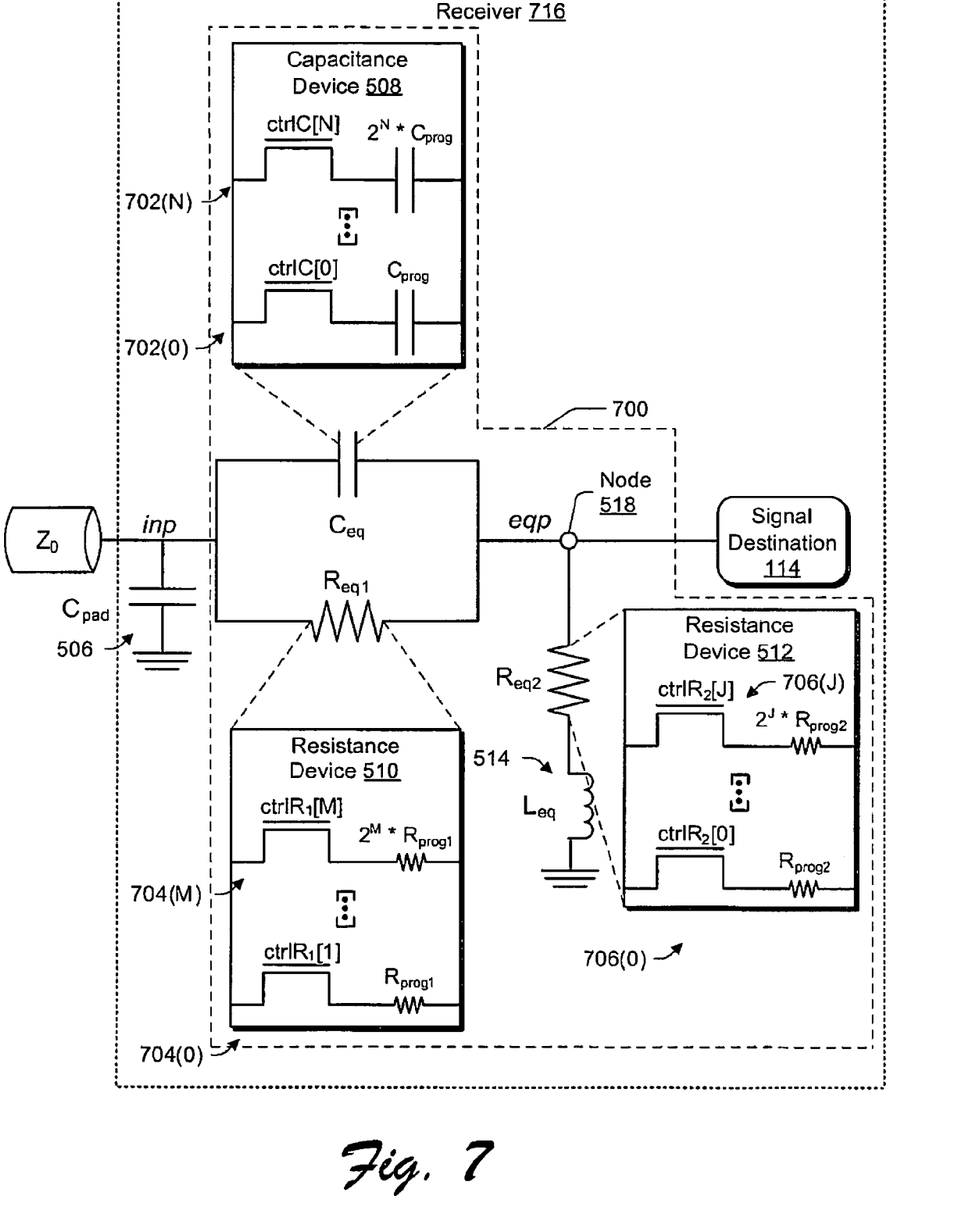
FIG. 7 is an illustration in an exemplary implementation showing the passive equalizer of FIG. 5 as being programmable.

Reference will now be made to FIGS. 5-7, which show exemplary implementations of the passive equalizer 106 of FIG. 1. As shown in the following illustrations, the passive equalizer 106 may be implemented in a wide variety of ways, such as a "simple" passive equalizer having a relatively low number of components as shown in FIGS. 5-6 and a programmable passive equalizer as shown in FIG. 7.

FIG. 5 shows an exemplary implementation 500 of the passive equalizer 106 of FIG. 1 in greater detail as employed in a single-ended line. The passive equalizer 106 is illustrated as receiving an input from an input pad 502 (which is also illustrated as "inp" in FIG. 5) which is communicatively coupled to a transmission line 504 (which is illustrated as having an impedance characteristics value of "$Z_0$") and a pad capacitance "$C_{pad}$" 506. The passive equalizer 500 then provides an output to a signal destination 114, which as previously described may be configured in a variety of ways to receive the signal from the passive equalizer 500, and thus is not necessarily representative of a "final" destination for the signal.

The passive equalizer 500 is illustrated as including a capacitor device 508, a first resistor device 5 10, a second resistor device 512 and an inductor device 514, all of which are illustrated as a part of a receiver 516. The capacitor device 508 and the first resistor device 510 are illustrated as arranged in parallel to accept an input from the input pad 502 and provide an output to a node 518, which is also labeled as "eqp" in FIG. 5. The second resistor device 512 and the inductor device 514 are arranged in series to also provide an output to the node 518. Although the second resistor device 512 is illustrated as connected to the output node 518 and the inductor device 514, in another implementation the placement of the resistor 512 and inductor 514 devices may be switched such that the inductor device 514 is placed between the output node 518 and the resistor 512.

The capacitor device 508 is illustrated as having a capacitance value of "$C_{eq}$" and the first resistor device 510 is illustrated as having a resistance value of "$R_{eq1}$". Additionally, the second resistor device 512 is illustrated as having a resistance value of "$R_{eq2}$", and the inductor device 514 is illustrated as having an inductance value of "$L_{eq}$". Further discussion of these values may be found following the discussion of FIG. 6.

FIG. 6 illustrates an exemplary implementation 600 showing the passive equalizer 106 of FIG. 1 in greater detail as employed in differential lines. If two single-ended passive equalizers 500 as shown in FIG. 5 are used for the differential lines, the mismatches in the two inductors can lead to differential noise. Use of the passive equalizer 106 in differential mode as shown in the implementation 600 of FIG. 6 eliminates differential noise by eliminating the inductor mismatch. The passive equalizer 500 also serves as the differential termination. Although parenthetical expressions are utilized in the reference numbers of FIG. 6 to show correspondence of like components of the passive equalizers of FIGS. 5 and 6 (e.g., signal destination 114 with signal destinations 114(1), 114(2), and so on) and matching values (e.g., "$C_{eq}$", "$R_{eq1}$", "$R_{eq2}$", "$L_{eq}$") are shown for the sake of clarity and brevity of the discussion, although it should be apparent that the components and values of the passive equalizer 106 of FIG. 6 may not necessarily be the same.

Choosing the right components values is important for the passive equalizer design. The discussions that follow refer to the passive equalizer implementation 500 as shown in FIG. 5. It should be noted, however, that while the discussions, equations, and optimization procedure refer to this particular implementation here, they are applicable, with appropriate modifications, to any other passive equalizer design. A person skilled in the arts will recognize such modifications.

A variety of challenges may be encountered when designing a passive equalizer, such as to accurately control the peaking gain and the peaking frequency of the passive equalizer 500. These two parameters are strongly dependent on process variations of the passive components, whose values can vary as much as plus or minus fifty percent from their nominal values in some processes.

The inductor value "$L_{eq}$" is determined by the layout geometry and the process profile. Modeling the exact value of "$L_{eq}$" and controlling its value, however, may be difficult. Hence, an assumption may be made that there is limited to no programmability over the inductor value "$L_{eq}$", and this value may be accepted as a random variable with a range determined by the process, e.g., plus or minus variation from nominal value as previously described.

The peaking (angular) frequency of the passive equalizer 500 response may be represented as follows:

$$\omega peak = 1/\sqrt{L_{eq} \cdot C_{eq}}$$

The peaking frequency may be shifted by an amount determined by "$R_{eq1}$" and "$R_{eq2}$", such as to provide an optimal "eye" for the passive equalizer.

The voltage gain of the passive equalizer may be represented as follows:

$$DC = \frac{R_{eq2}}{R_{eq1} + R_{eq2}}; \text{ and at}$$

$$\omega_{peak} = \frac{R_{eq2} + j\omega_{peak} \cdot L_{eq}}{R_{eq2} + j\omega_{peak} \cdot L_{eq} + ((1/j\omega_{peak} \cdot C_{eq}) // R_{eq1})}$$

The above equations optimize the passive equalizer 500 alone. The presence of pad capacitance "$C_{pad}$", however, low-pass filters the received signal at the input pad 502. Consequently, an overall response of the passive equalizer 500 and "$C_{pad}$" 506 peaks at a frequency lower than the value "$\omega_{peak}$". Also, since the passive equalizer 500 also serves as termination in this example, "$Z_{effective}$" (i.e., the combined effective impedance of the passive equalizer 500 and "$C_{pad}$") may match the characteristic impedance "$Z_0$" of the channel better at high frequencies than the $Z_{effective}$ of a termination resistor (equal to $Z_0$) and $C_{pad}$.

FIG. 7 illustrates a programmable passive equalizer implementation 700 of the passive equalizer 500 of FIG. 5 as configured for programmability. Like FIG. 5, the passive equalizer 700 is illustrated as including a capacitor device 508, a first resistor device 510, a second resistor device 512 and an inductor device 514. The capacitor device 508 and the first resistor device 510 are illustrated as arranged in parallel to accept an input from the input pad 502 and provide an output to a node 518, which is also labeled as "eqp" in FIG. 5. The second resistor device 512 and the inductor device 514 are arranged in series to also provide an output to the node 518.

In this example, however, the passive equalizer is programmable, such as to address manufacturing process variations, channel variations, and changes in channel conditions, and is also be programmable to peak at variable frequencies when the signaling frequency changes. This programmability may be provided in a variety of ways.

For example, the capacitor device 508 may be implemented by a parallel combination of a plurality of controllable capacitors 702(0), . . . , 702(N). The illustrated controllable capacitors 702(0)-702(N), illustrated to provide different amounts of capacitance ranging from "$C_{prog}$" to "$2^N*C_{prog}$", are enabled/disabled by respective control signals illustrated as ctrlC[0], . . . , ctrlC[N].

Likewise, the resistor device 510 may be implemented by a parallel combination of a plurality of controllable resistors 704(0), . . . , 704(M). The illustrated controllable resistors 704(0)-704(M), illustrated to provide different amounts of resistance ranging from "$R_{prog1}$" to "$2^M*R_{prog1}$", are enabled/disabled by respective control signals illustrated as ctrlR$_1$[0], . . . , ctrl R$_1$[M]).

Likewise, the resistor device 512 may be implemented by a parallel combination of a plurality of controllable resistors 706(0), . . . , 706(J). The illustrated controllable resistors 706(0)-706(J), illustrated to provide different amounts of resistance ranging from "$R_{prog2}$" to "$2^J*R_{prog2}$", are enabled/disabled by respective control signals illustrated as ctrlR$_2$[0], . . . , ctrl R$_2$[J]). It should be noted that the number of controllable resistors 704(0)-704(M) included in resistor device 510 may be different than the number of controllable resistors 706(0)-706(J) included in resistor device 512.

Even though programmability is described and shown here in FIG. 7 for the passive equalizer implementation 700 of a receiver 716, it should be noted that the same techniques can be applied to any passive equalizer described in any system in the general sense, such as in the passive equalizer 106 shown in FIG. 1.

The programmable passive equalizer 700 as shown in FIG. 7 may be utilized to address a wide variety of considerations. For example, inductor-capacitor circuits (i.e., LC tanks) were previously considered to have a narrow band, in which, the LC tanks peak at a single frequency, making the design optimal for a single signaling speed. Therefore, when the link length changed or the signaling speed changed, the previous LC-tank responses could not track these changes. Additionally, as previously described, component values may vary because of manufacturing and process variations, making accurate equalization difficult. By providing for programming of the passive equalizer 700, however, these considerations may be addressed.

The programmability/tunability allows tweaking of the other characteristics of the passive equalizer design. For instance, as stated earlier, the DC gain of the passive equalizer 700 is dependent on the relative values of "$R_{eq2}$" and "$R_{eq1}$", and hence the expected variation in the DC gain is smaller than the variations in the individual resistor values. Controllable resistors (e.g., 704(0)-704(M), 706(0)-706(J)) allows adjustment of the DC gain. Additionally, these resistor controls may also help to bring "$Z_{effective}$" to better match "$Z_0$" in equalizers placed at a front-end as described in relation to FIGS. 2-3. Thus, the capacitance and the resistance provided by the respective capacitor device 508 and resistor devices 510, 512 may be programmed for a wide variety of considerations, such as to address process variations, changes in signal frequency and/or channel conditions, and so on.

The passive equalizer 700 may be programmed in a variety of ways. For example, the passive equalizer 700 may be programmed through use of an inductor-capacitor phased-locked loop (LC-PLL) circuit for clocking. The LC-PLL parameters provide an option to tune the passive component values and hence compensate for changes. By picking the correct value for the programming capacitance "$C_{prog}$", for instance, the control signals (e.g., ctrlC[N:0] of FIG. 7) may utilize the same digital controls employed to control an LC-tank oscillation frequency in the LC-PLL. Therefore, additional extra hardware is not needed to provide programmability. The feedback loop in the LC-PLL may compensate for variations in inductance (L) and capacitance (C) values, bringing the LC-tank to oscillate at the desired frequency. Since the passive equalizer 700 component values may be chosen to make the equalizer peaking frequency track the LC-oscillator frequency in the LC-PLL, the controls also bring the passive equalizer to peak at the desired frequency. In an implementation, the passive equalizer 106 does not require a level of accuracy that is required by the LC-PLL controls, and hence the number of digital control signals may be reduced. Additionally, fine analog tuning voltage in the LC-PLL is not required. By monitoring the LC-tank oscillation frequency in the LC-PLL, digital controls of the passive equalizers are set. In this way, the equalizer peaking frequency may be optimized to track a change in signaling frequency, may compensate for process variations and channel changes at a fixed signaling frequency, and so on.

If an on-chip LC-PLL is not available, a small LC-PLL-like process calibration circuit may be implemented. Since this is a process calibration circuit, it does not require the same level of accuracy that a LC-PLL typically offers, and hence may be significantly smaller (e.g., use less area of the chip) and simpler, e.g., use a few number of components. For instance, basic input/output system (BIOS) parameters may be utilized for a crude setting. A "tweak" may then be performed through the use of a relatively small compensation loop to obtain finer tuning, e.g., by using a small counter as opposed to a PLL.

Exemplary Procedures

The following discussion describes passive equalizer tuning/programming optimization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the systems of FIGS. 1-7.

Figure 8:
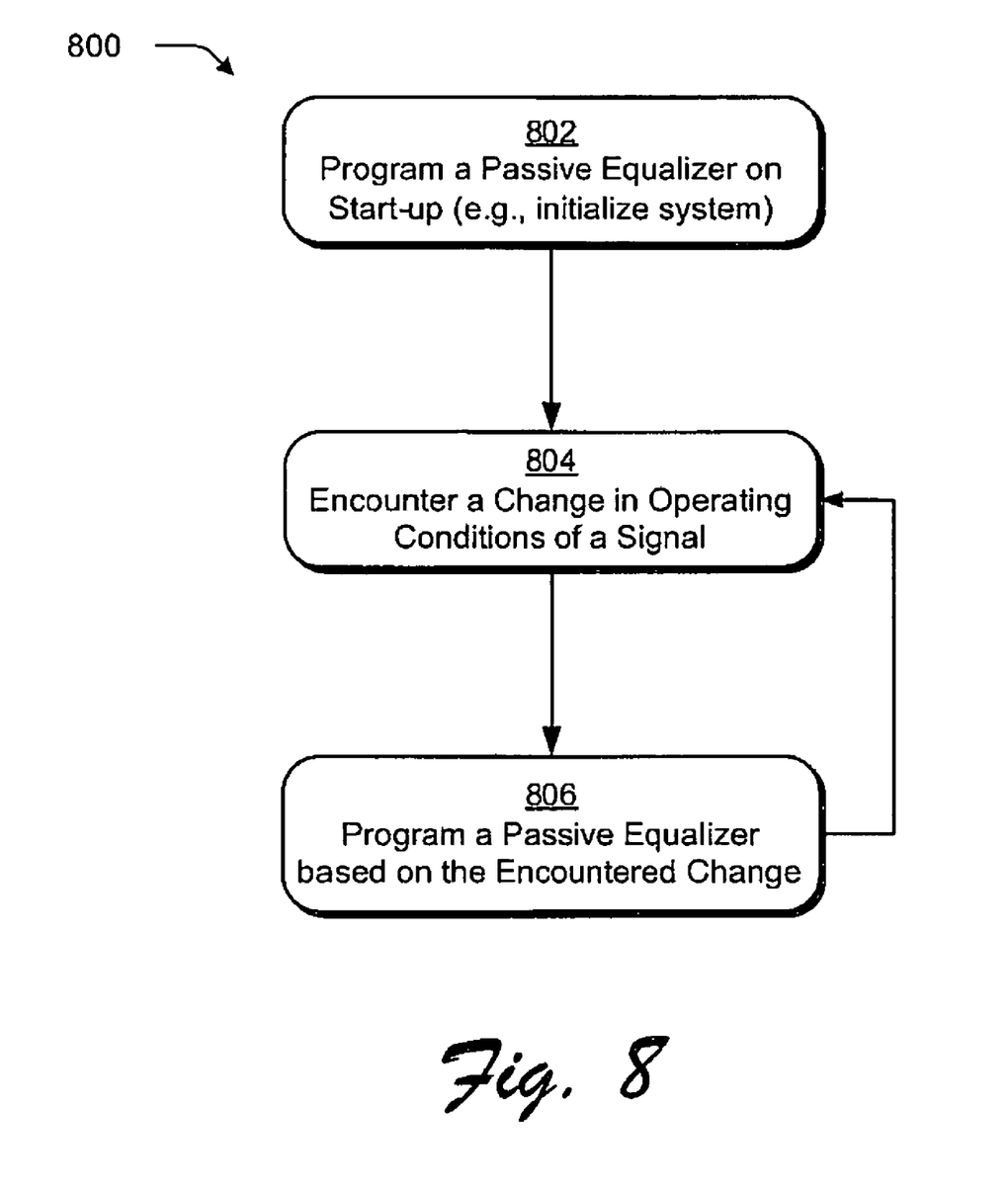
FIG. 8 is a flow diagram depicting a procedure in an exemplary implementation in which a passive equalizer is programmed based on an encountered change in operating conditions.

FIG. 8 is a flow diagram depicting a procedure 800 in an exemplary implementation in which a passive equalizer is programmed based on an encountered signal. A passive equalizer is programmed at start-up (block 802), such as when a system including the passive equalizer is initialized.

Detection mechanisms or circuits are implemented to detect a change in operating conditions (block 804). A variety of changes may be encountered, such as due to detecting a manufacturing variation (e.g., length), frequency, signal, change in temperature, and so on. For example, a change in frequency may be detected by an LC circuit included on the integrated circuit.

A passive equalizer is programmed (e.g., reprogrammed) based on the encountered change (block 806). As previously described, for instance, the passive equalizer 106 may be programmed through use of the LC-PLL. The LC-PLL parameters provide an option to tune the passive component values and hence compensate for changes. By picking the correct value for programming capacitance "$C_{prog}$", for instance, the control signals (e.g., ctrlC[N:1] of FIG. 7) may utilize the same digital controls employed to control an LC-tank oscillation frequency in the LC-PLL. The feedback loop in the LC-PLL may compensate for variations in inductance (L) and capacitance (C) values to bring the LC-tank to oscillate at the desired frequency. Since the passive equalizer 106 component values may be chosen to make the equalizer peaking frequency track the LC-oscillator frequency in the LC-PLL, the controls also bring the passive equalizer to peak at the desired frequency. A variety of other examples are also contemplated. The procedure 800 may then return to block 804 and this portion of the procedure 800 may be repeated as additional changes are encountered. Thus, continuing external changes to operating conditions of the circuit may be addressed by reprogramming the circuit.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A passive equalizer comprising:
    a first programmable resistor device that includes a plurality of resistors that is controllable to provide differing amounts of resistance;
    a programmable capacitor device that includes a plurality of capacitors that is controllable to provide differing amounts of capacitance, wherein the first programmable resistor device and the programmable capacitor device are arranged in parallel to provide an output to a node;
    a second programmable resistor device that includes a plurality of resistors that is controllable to provide differing amounts of resistance; and
    an inductor device, wherein the second resistor device and the inductor device are arranged in succession, one to another, to provide an output to the node.

2. A passive equalizer as described in claim 1, wherein the programmable capacitor device is programmable to control peaking gain.

3. A passive equalizer as described in claim 1, wherein the programmable capacitor device is programmable to control peaking frequency.

4. A passive equalizer as described in claim 1, wherein the plurality of capacitors is controllable to compensate for frequency changes to a signal.

5. A passive equalizer as described in claim 1, wherein one or more programmable resistor devices are programmable to control peaking gain.

6. A passive equalizer as described in claim 1, wherein one or more programmable resistor device are programmable to control peaking frequency.

7. A system comprising:
- a signal source; and
- an input/output channel communicatively coupled to the signal source, wherein the input/output channel includes a termination network implemented at least in part by a passive equalizer, wherein the passive equalizer includes:
- a first programmable resistor device that includes a plurality of resistors that is controllable to provide differing amounts of resistance;
- a programmable capacitor device that includes a plurality of capacitors that is controllable to provide differing amounts of capacitance;
- a second programmable resistor device that includes a plurality of resistors that is controllable to provide differing amounts of resistance; and
- an inductor device;
- the first programmable resistor device and the programmable capacitor device are arranged in parallel to provide an output to a node; and
- the second resistor device and the inductor device are arranged in succession and in series, one to another, to provide an output to the node.

8. A system as described in claim 7, wherein the passive equalizer is placed after buffering in a receiver of the input/output channel.

* * * * *